United States Patent
Cordesses et al.

(10) Patent No.: US 8,077,334 B2
(45) Date of Patent: Dec. 13, 2011

(54) METHOD AND APPARATUS FOR MANAGING PRINTING SOLUTIONS IN A LOCAL AREA NETWORK

(75) Inventors: Joel Cordesses, Antibes (FR); Christophe Tcheng, Valbonne (FR); Mathieu Ribault, Grasse (FR); Stéphane Monbel, Nice (FR); Pierre Dor, Vence (FR)

(73) Assignee: Amadeus S.A.S., Sophia Antipolis Cedex (FR)

( * ) Notice: Subject to any disclaimer, the term of this patent is extended or adjusted under 35 U.S.C. 154(b) by 1278 days.

(21) Appl. No.: 11/787,174

(22) Filed: Apr. 13, 2007

(65) Prior Publication Data
US 2008/0252910 A1   Oct. 16, 2008

(51) Int. Cl.
G06F 3/12 (2006.01)
G06K 15/02 (2006.01)

(52) U.S. Cl. ........................ 358/1.15; 358/1.1
(58) Field of Classification Search .............. 358/1.1, 358/1.9, 1.12, 1.13, 1.14, 1.15, 1.18, 468; 709/201, 203, 213, 220, 238
See application file for complete search history.

(56) References Cited

U.S. PATENT DOCUMENTS

| 5,559,933 | A | 9/1996 | Boswell |
| 6,678,750 | B2 * | 1/2004 | Meade et al. ............... 710/7 |
| 7,310,720 | B2 * | 12/2007 | Cornett ..................... 711/170 |
| 2001/0015972 | A1 * | 8/2001 | Horiguchi et al. ......... 370/352 |
| 2001/0046059 | A1 | 11/2001 | Motamed et al. |
| 2002/0015169 | A1 | 2/2002 | Vidyanand |
| 2002/0097421 | A1 | 7/2002 | Lomas et al. |
| 2002/0184304 | A1 | 12/2002 | Meade et al. |
| 2002/0196451 | A1 | 12/2002 | Schlonski et al. |
| 2003/0048759 | A1 | 3/2003 | Cara |
| 2003/0136841 | A1 | 7/2003 | Alleshouse |
| 2003/0145070 | A1 | 7/2003 | Cariffe |
| 2003/0182438 | A1 | 9/2003 | Tenenbaum |

(Continued)

FOREIGN PATENT DOCUMENTS
WO   WO 00/58822   10/2000

OTHER PUBLICATIONS

Cuddy S., et al. "Context-aware service selection based on dynamic and static service attributes", XP010839725—Abstract paragraphs 000I, 00II, 00IV.

*Primary Examiner* — Gabriel Garcia
(74) *Attorney, Agent, or Firm* — Drinker Biddle & Reath LLP

(57) ABSTRACT

Method of managing printing using multiple workstations, each with unique ID, and multiple printers having a type and configuration dependent on the ID, in a network including a document server and identification generator. At least one printer is connected to a workstation. The network polls a workstation upon connection to the network to determine what printers are connected to it; determines workstation ID, printer type and configuration from type and workstation location, and ID code for each connected printer using the identification generator; develops a look-up table of workstation ID, type and configuration of printer, and ID code; receives a print request from a workstation at the document server; in response to the request identifies from the look-up table the configuration of a printer that can receive the print request; and sends the print request to the identified printer with the appropriate ID code, as identified by the look-up table.

16 Claims, 10 Drawing Sheets

U.S. PATENT DOCUMENTS

| | | |
|---|---|---|
| 2003/0200289 A1 | 10/2003 | Kemp et al. |
| 2003/0204612 A1 | 10/2003 | Warren |
| 2003/0210423 A1 | 11/2003 | Stringham et al. |
| 2003/0230124 A1 | 12/2003 | Johnson et al. |
| 2003/0231328 A1 | 12/2003 | Chapin et al. |
| 2004/0061729 A1 | 4/2004 | Green et al. |
| 2004/0156074 A1 | 8/2004 | Kim |
| 2004/0167974 A1 | 8/2004 | Bunn et al. |
| 2004/0210897 A1 | 10/2004 | Brockway et al. |
| 2004/0223182 A1 | 11/2004 | Minagawa |
| 2004/0236789 A1 | 11/2004 | Uchida et al. |
| 2004/0252329 A1 | 12/2004 | Sorenson |
| 2005/0099442 A1 | 5/2005 | Payne |
| 2005/0162677 A1 | 7/2005 | Toumanova et al. |
| 2006/0119882 A1 | 6/2006 | Harris et al. |
| 2006/0221386 A1 | 10/2006 | Brooks et al. |
| 2006/0230403 A1 | 10/2006 | Crawford et al. |
| 2006/0250635 A1* | 11/2006 | Masuda et al. .............. 358/1.14 |

* cited by examiner

METHOD AND APPARATUS FOR MANAGING PRINTING SOLUTIONS IN A LOCAL AREA NETWORK

FIELD OF THE INVENTION

The present invention relates to a method and apparatus for managing printing solutions in one or more local area networks, in particular in the travel reservation domain but also anywhere where large numbers of work stations and printers which need not be dependant on each other are operated.

BACKGROUND OF THE INVENTION

There is a vast number of patents related to the management and the control of peripheral devices such as printers for example, in networks.

WO2000/052601 discloses a system that is capable of booking travel through a computer network by allocating communication links on a dynamic and distributed basis. It does not deal with the generation, storage, or auto adaptation of printer configurations and a management of the same by location or type identifiers.

US2003/145070 discloses a method for configuring a printer device with a specific controller. This controller can determine the physical environment of the printing device and what kind of device is asking for a printer. The controller can then configure the printer depending on the source device and in relation to a printing solution based on location and addresses for a mobile printer. The location of the printer, which is established by a position beacon, is determined in order to establish a link with a work station locally or remotely. It deals with a different set of issues than the current invention.

US2004/156074 discloses a method of printing data using a identification number of a printer instead of a network address. Thus if the network address of the printer is changed the user does not need to reset the printer port in order to update it with the new address of the printer. The port can still process the printing. This type of system is commonly referred to a fixed mode terminal identifier (TID). This fixed mode type of system requires an inventory of fixed work stations and devices. One configuration (including type, set up, TID, etc. . . . ) is defined per work station and per application. A device administrator administers this inventory using device administration. This requires continual manual input and activity whenever there are changes to the work stations and other peripheral devices.

In general the systems described in the prior art raise operational issues when dealing with very large number of devices.

SUMMARY OF THE INVENTION

An object of the present invention is to overcome at least some of the problem associated with the prior art method of controlling printing management.

Another object of the present invention is to define a manner in which to manage and administrate the logical address and physical configuration of a set of printers and how this may be automated.

According to one object of the present invention there is provided a method of managing printing in an environment with a plurality of work stations and a plurality of printers in one or more networks each work station having a unique identifier (ID) and each printer having a type and a configuration which is dependant on the unique ID, wherein one or more of the printers is connected to a one of the plurality of work stations; and wherein the network also includes a document server and an identity generator, the method comprising:

polling a work station when it connects to the network to determine what printers are connected thereto;
  determining the unique ID of the work station;
  determining the type of printers;
  determining the configuration of the printer from the type and work station unique ID;
  determining an identification code (ID code) for each printer connected to the connected work station using the identity generator;
  developing a look up table of unique ID of the work station; type and configuration of the printer and ID code;
  receiving a print request from a client application or user at the document server;
  identifying the configuration of the printer from the look up table in response to the print request;
  sending the print request to the printer with the appropriate ID code, as identified by the look up table.

This invention has a number of advantages. It provides an auto registration process which allows retrieving, creating and updating a workstation configuration, including the configuration of its attached devices, without any administration. The storage of work station data in an identity generator data base allows transparent handling of fixed and dynamic addressing as well as configuration. The inventive identity generator can be used in any environment where a work station has a unique identifier and a list of attached devices for each type of workstation is well-known. For example, this may be of used in airports, stations, call centers, and possibly in shops where there are large number of tills and printing devices for printing out receipts etc.

BRIEF DESCRIPTION OF THE DRAWINGS

Reference will now be made by way of example to accompanying drawings in which.

DETAILED DESCRIPTION OF THE INVENTION

Figure 1:
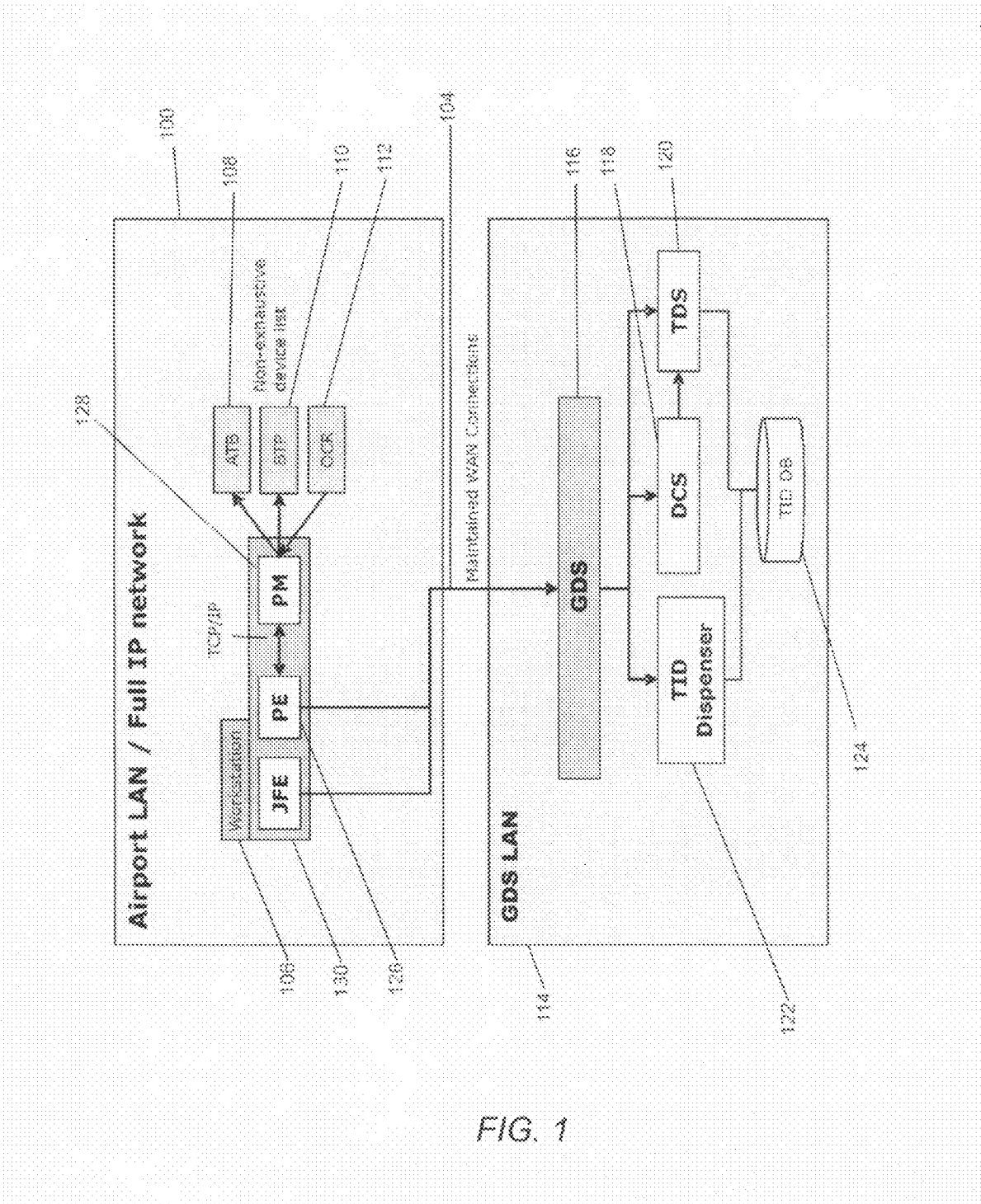
FIG. 1 is a high level view of the present invention.

Referring now to FIG. 1, the architecture of the printing solution and the position of the identity generator or TID dispenser is shown. The diagram shows an airport LAN or full IP network 100 which is connected to a GDS LAN 114 by means of a communication module 104.

The airport LAN includes one or more work stations 106. A work station may have connected thereto a number of attached devices of different types. In this example, this could be an automatic ticket and boarding pass (ATB) printer 108, a bag-tag printer (BTP) 110 and an optical character recognition (OCR) reader or printer 112.

The global distribution system LAN, GDS LAN, includes the following elements: A GDS module 116, a departure control system (DCS) 118, a print server or document server (TDS) 120, and a terminal ID dispenser (TID Dispenser) 122. There may also be a TID database 124 for facilitating replication of the data in the TID dispenser 122. This may also include redundancy.

Local communication between the work station and the printing devices is effected by a printer emulator 126 installed on the work station. A printer manager 128 is also shown that manages any printing events. The communication between the printer emulator and printer manager is via a TCP/IP link, for example. The work station also includes a java front end (JFE) 130 or any other type of Graphical User Interface (GUI) or user interface. Auto registered devices in accordance with the present invention do not require any device identity inventory maintained by a device administrator. Instead the device identity inventory is built and maintained automatically by the TID dispenser as the work stations log in. Device address attribution and configuration management is carried out by the terminal identity dispenser (TID) dispenser, and document formatting and delivery is managed by the document server (TDS).

The TID dispenser assigns TIDs to devices according to a work station ID and an application identifier and can review, create, update, retrieve or otherwise determine the configuration of those devices. This will be described in greater below. The print server formats the document requested by the DCS, and then route the print traffic to the identified printer that has been identified by the TID dispenser and the management thereof. The TID dispenser of the present invention can be adapted to different system requirements and is compatible with both fixed and automated TID devices. In the automated TID devices there would no longer be a requirement for device administrators maintaining a full device inventory. Instead an auto registration process will allow a work station to retrieve, create and update configuration without administration. This will now be described in greater detail.

The TID dispenser requires that each work station has an identifier that is unique on the worldwide basis. It would have been appreciate that the worldwide basis in this example relates to the extent of the network over which the invention applies. This may be an individual airport, this may be a number of different airport in different geographic location or maybe genuinely be on a worldwide basis. The identifier must be available on the work station and it is read by the printer emulator on the work station and provided to the TID dispenser. Work station identifier is essential for all work stations. The TID dispenser also uses the full location, i.e. the physical location of the work station. The full location can include for example airport, city, terminal, building, category, index, field etc. Not all fields of the full location are necessarily required. For example, for locations where the index is not meaningful it does not need to be specified. Similarly any other type of location codes could be a use for example building, stage, orientation, etc. . . . Any other type of discrimination or definition could be used in addition to (or instead of) the full location for example the function of the device, the level of priority, the year of deployment, company, etc. . . . The full location or an other discrimination or definition can be incorporated into the unique identifier of the work station. This means that only a unique identifier needs to be determined in the simplest case. The full location or other discrimination or definition is sent to the TID dispenser. The full location or other discrimination or definition is an essential feature for all auto register devices.

Each printer emulated embedded application may benefits from an application identifier, the application identifier including an application label and an application index field. For example two graphical user interfaces or client application started on a work station will be referred to as App 1 and App 2 respectively. In an embodiment of the invention, the application label is stored in the GUI and the application index is provided to the printer emulator in the start command line. Application label and index are essential in circumstances where multiple applications are running at the same time on a specific work station and if it is required that the printers have different ID and configuration according to the application. The system can work without application identifier in the situation where each printer or device has the same ID and configuration whatever the application running on the workstation. Any different identifier could be used to allocate different IDs and configurations to the same device such as for example a category code, a user identifier instead of the application identifiers mentioned above.

Device set up record gives us some low level parameters of the physical devices. These parameters are used by document servers for formatting and printing. In an embodiment of the invention, the administration of device set-ups is available in a device administration GUI.

In the auto registration mode described below, device set ups are generally homogenous with the full location or any other type of discriminator or definition deployed for a given device type.

Figure 2:
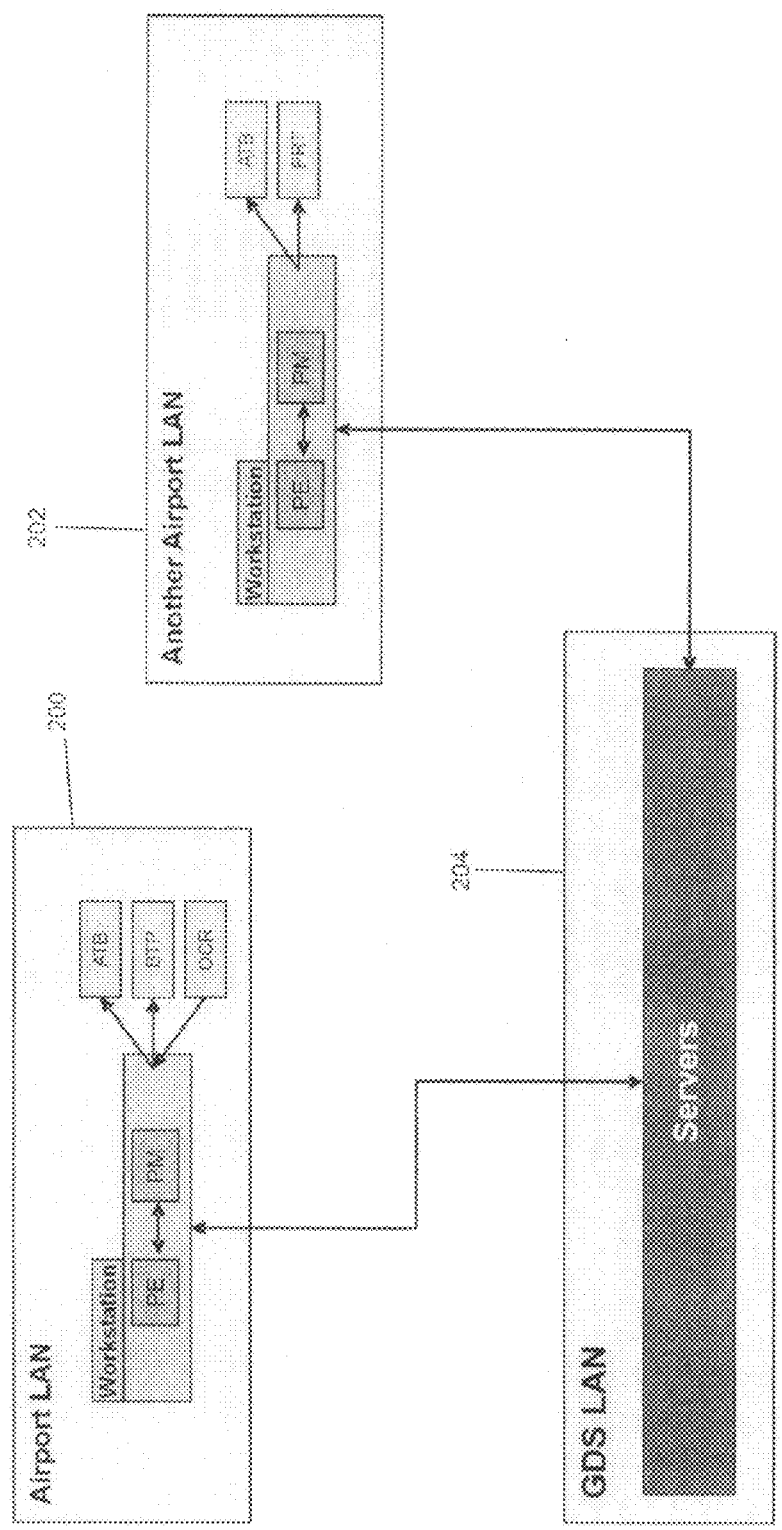
FIG. 2 is a high level view of a second embodiment of the present invention.

Referring now to FIG. 2 a more expansive network set up is shown. Here there are two airport LANs 200 and 202 connected to a GDS LAN 204. All the LANs may be in the same or different physical/geographic locations. Each airport LAN includes one or more work stations and printers equivalent to work station 106 and printers 108, 110 and 112 in FIG. 1. The GDS LAN is substantially similar to the GDS LAN 114 in FIG. 1.

Figure 3:
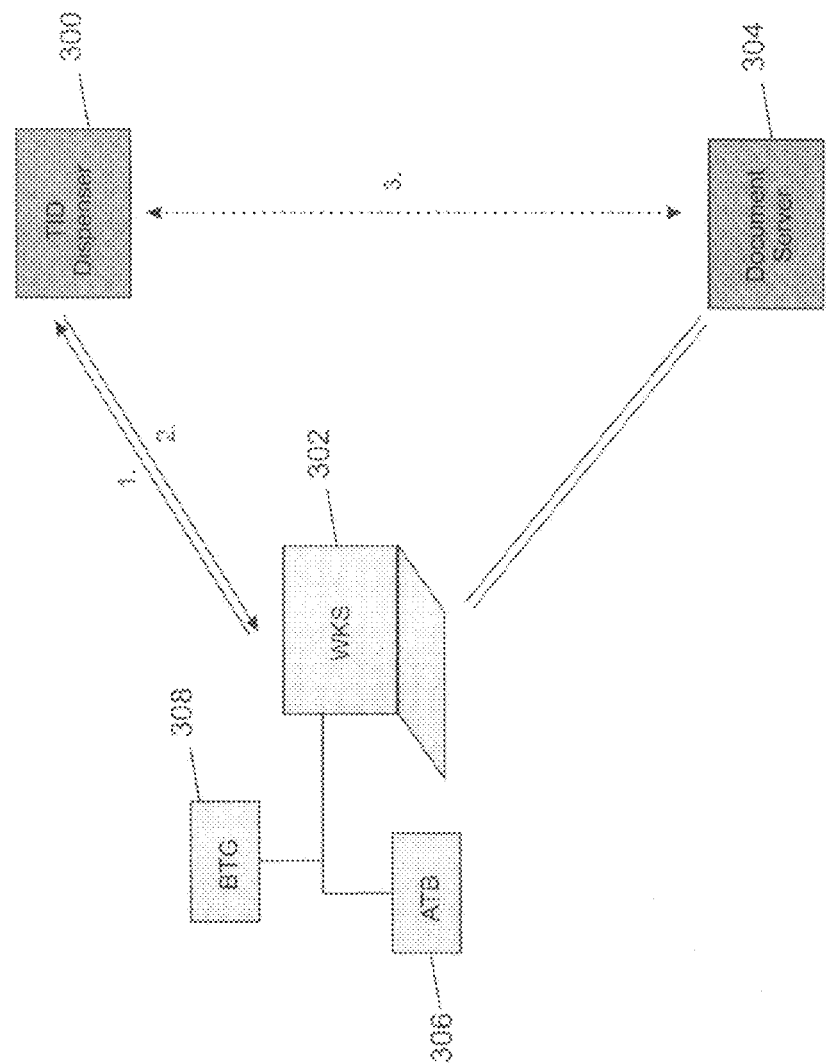
FIG. 3 is a block diagram of the system including a terminal identity generator (TID dispenser) in accordance with one aspect of the present invention.

The manner in which the TID dispenser is connected into the system is shown with respect to FIG. 3. The TID dispenser 300 is connected to the work station 302 via a bidirectional connection. The work station is also connected to a document server 304. The work station is shown having two printer ports an automatic ticket and boarding pass ATB printer 306 and a bag-tag printer BTG 308.

Information is passed from the work station (arrow 1 the information includes work station ID (identifier and full location); application identifier (label and index); and list of detected devices with type. This information is registered in the TID dispenser 300. The TID dispenser then generates a list of TIDs that may be fixed or auto registered. This information is then returned to the work station by means of communication in the direction of arrow 2. Similarly, data is communicated with the document server so the document server knows the relevant printers for a specific work station. The information in a line of the database that constitutes the TID dispenser indicates a carrier, a work station ID and an application identifier and the configuration of all printers attached to the work station. Accordingly if there is more than one application on a specific work station each of application will have a different configuration in the TID dispenser data base.

Figure 4:
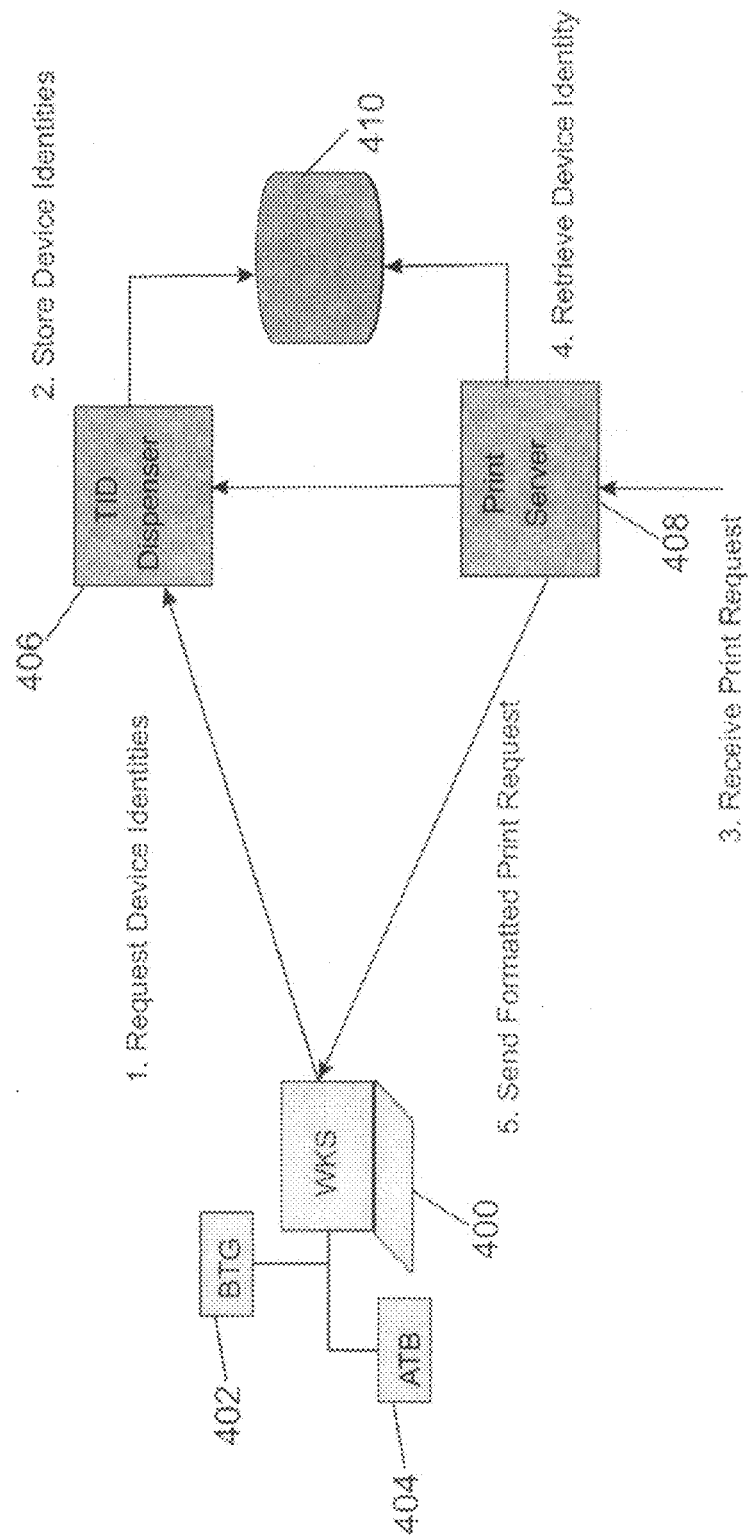
FIG. 4 is a diagram showing the auto registration for a first login to the TID dispenser of a work station.

Referring to FIG. 4 when a work station first logs into the system via the TID dispenser, the following sequence of events occurs. The work station 400 is connected to two active application devices 402 and 404 respectively. The work station is connected to the TID dispenser 406 and the document server 408. Similarly the document server and TID dispenser are connected to one of the other. The TID dispenser generates the configuration for the workstation and its connected devices. This configuration is stored in the TID dispenser database 410.

A print request may be generated and communicated to the document server. At that point the document server will interrogate the TID dispenser to determine the appropriate configurations templates and printers for the print request. The document server will then transmit the print request directly to the appropriately identify printer.

Figure 5:
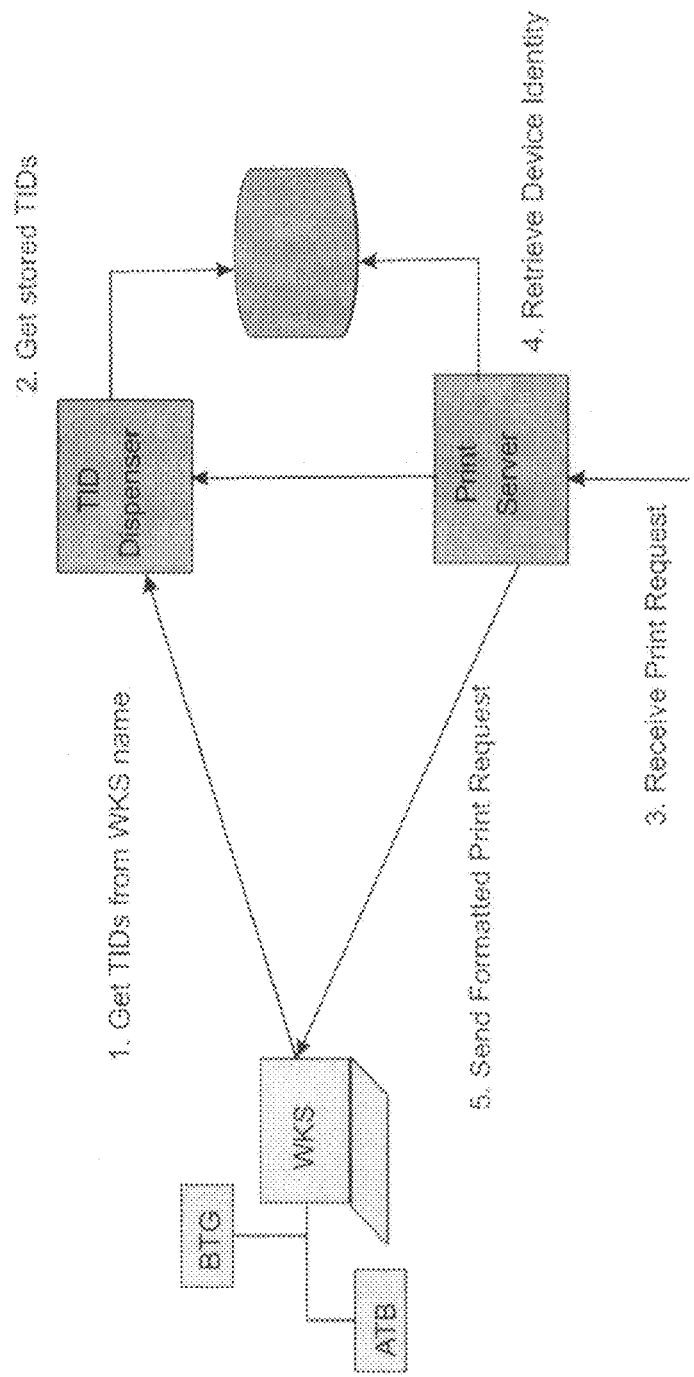
FIG. 5 is auto registration process for the next login of a work station.

Referring now to FIG. 5 the next time login of a work station is explained. As under the first example the printer emulator requests the TIDs for the work station/application combination.

It is considered as known work station as the work station identifiers are recognized. This step will be referred to as next login in the rest of the document. Again if a printer request is received at the document server, the document server will retrieve the relevant TID and configuration from the TID dispenser and implement the printing action at the required printer.

Figure 6:
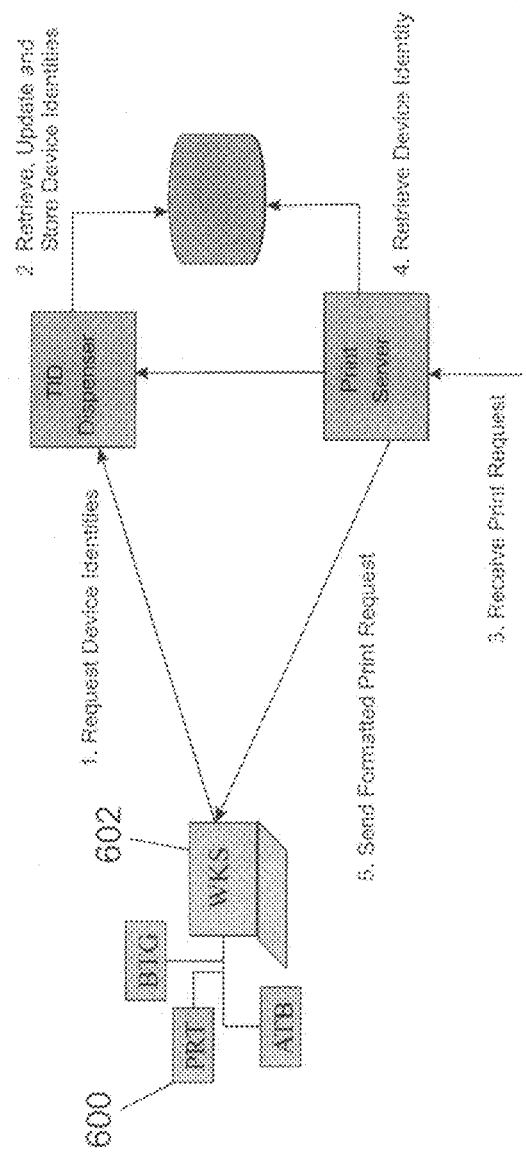
FIG. 6 is an auto registration example with the next login with updated work station configuration.

Referring now to FIG. 6 a new printer PRT 600 has been added to the work station 602. At this time when the work station connects to the TID dispenser it is recognized as a known work station but that new device is identified. This causes an additional a TID to be provided by the TID dispenser for that work station and included in the work station configuration. The update is communicated with the work station and the document server as has been described with reference to FIG. 4. These changes are stored and maintained until such time as the work station changes again. Similarly, if the work station reconnects in the next log in the new printer 600 will already identified and recognize and the actions will be equivalent to those shown with reference to FIG. 5 thereafter.

Figure 7:
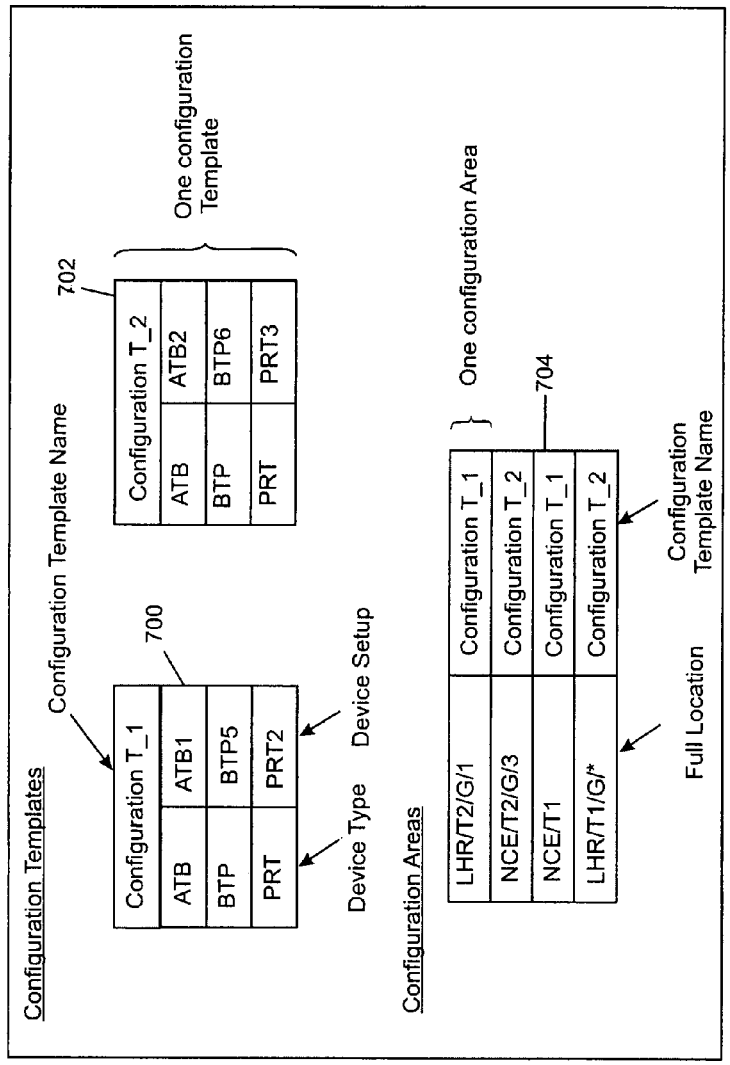
FIG. 7 are the configuration templates and configuration areas in accordance with one aspect of the present invention.

Further detail of the auto registration mechanism is now described. The auto registration of a work station is authorized on the basis of its full location or other discrimination or definition. A device administrator or an external application defines the locations where work stations can auto register. It is the role of the administrator to define two objects, configuration templates and configuration areas. Configuration templates store the links between device types and device set-ups. It is expected the configuration templates list all the possible device types that could be provided by a work station. This is the only role played by the device administrator. A configuration area associates a configuration template with a full location or other discriminator or definition. In the example shown in FIG. 7, configuration template have been attributed to NCE/T2/G/3 and NCE/T1 where NCE stands for Nice airport, T1 stands for Terminal 1, T2 stands for Terminal 2 and G stands for a gate number. NCE/T1 is considered as a full location distinct from for example NCE/T1/G/20 or NCE/T1/LNG. A wild card functionality is available to attribute a configuration template to several full locations. For example LHR/T1/G/* includes all the gates in terminal 1 of LHR airport whatever the index. That is a work station on LHR/T1/G/20 will use the configuration template, configuration T_2. Looking more closely at FIG. 7, it can be seen that configuration T_1, 700 shows the device type and the device set up. The configuration template name is identified in the top row and the whole of the table 702 constitutes one configuration templates. Dealing with the configuration areas, the full location is shown in the left column and the configuration template is in the right column. One configuration area is equivalent to one row of the table 704. In an embodiment, these configuration areas and templates can be created using a device administration GUI.

Figure 8:
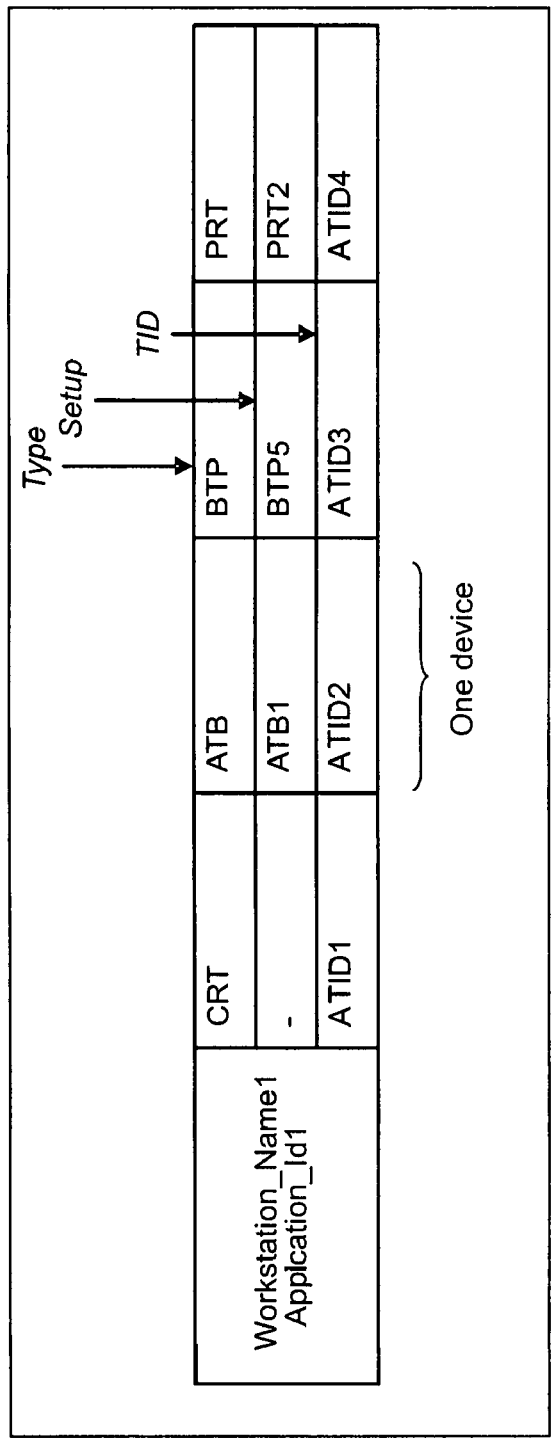
FIG. 8 is a representation of a work station configuration.

FIG. 8 shows an extract from the TID dispenser table which identifies the work station name and the application identifier along with the type, set up and TID indicator for the same. It can also be seen in FIG. 8 that each column constitutes one device attached to a specific work station.

Figure 9:
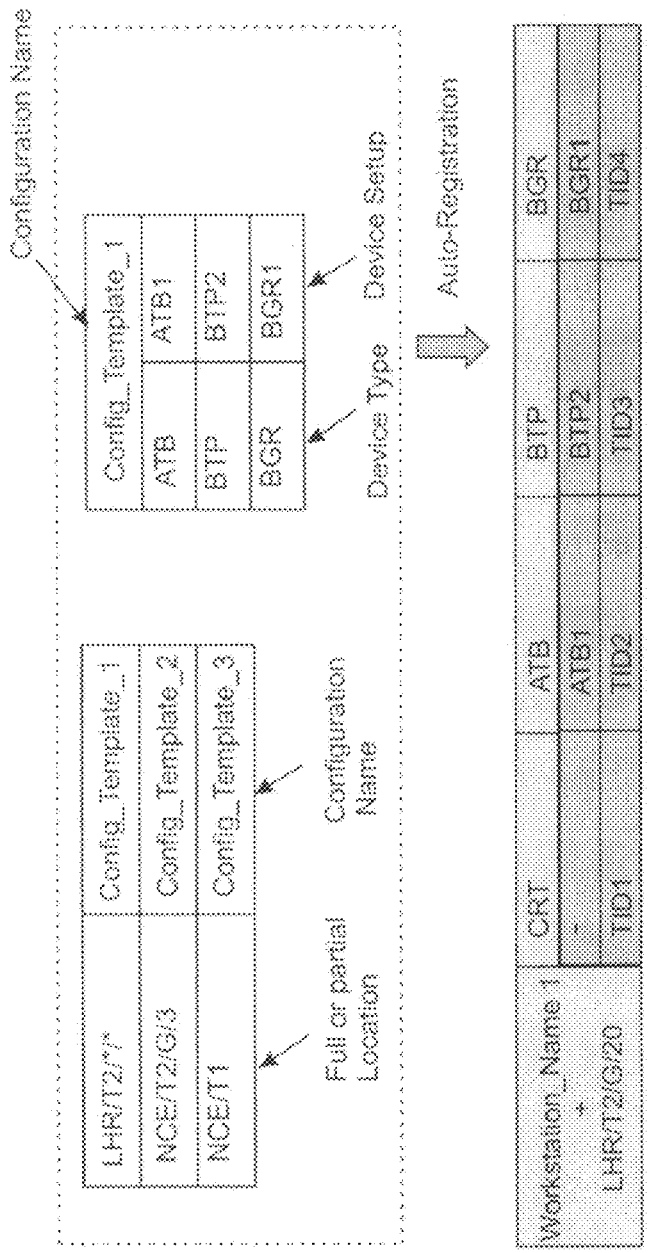
FIG. 9 is a diagram of auto registration configuration example.

FIG. 9 shows a configuration generated with the auto registration process. It also shows the information used by the auto registration process.

Figure 10:
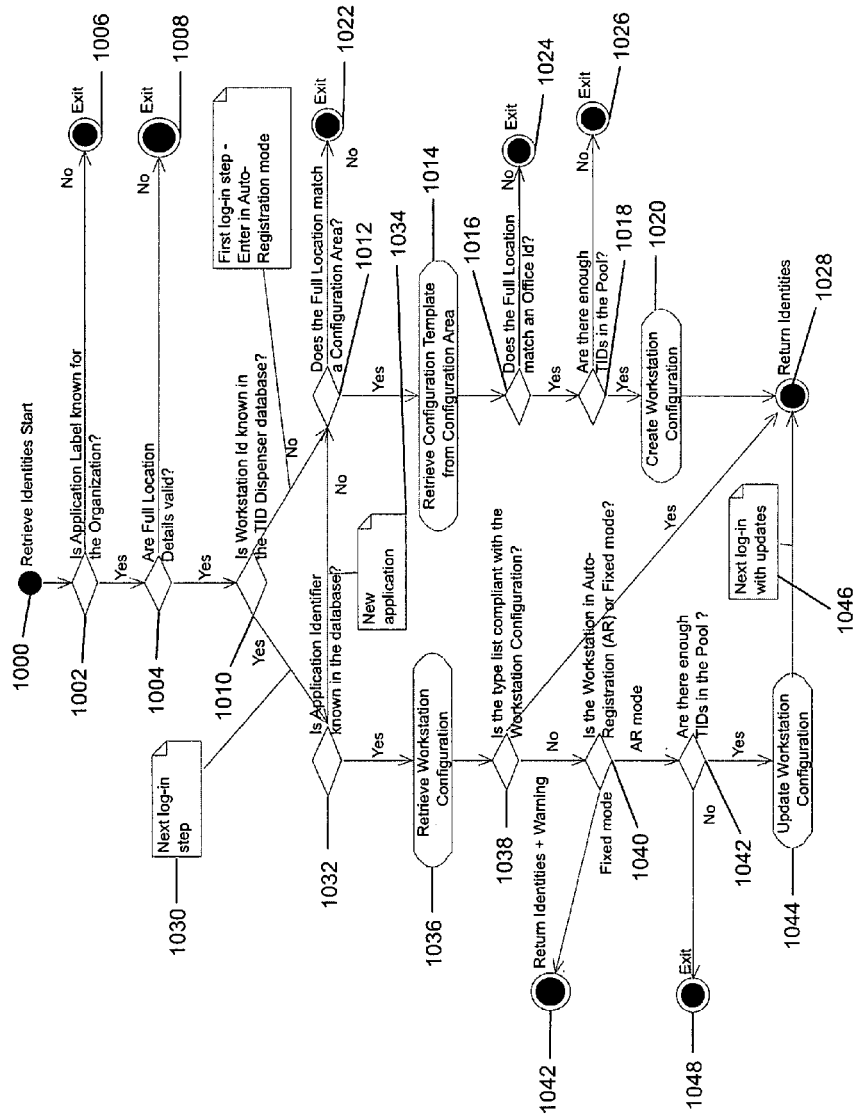
FIG. 10 is a flow chart other method steps is associated with the choice between fixed and auto-registration modes.

Referring now to FIG. 10, the process for determining whether the devices, workstations and printers etc are operated in fixed mode or auto registration mode is explained. The decision as to which mode should be selected is made in order to deal with the situation where certain workstations connected to one or more of the LANs is unable to operate in an auto registration mode. The steps carried out to achieve this selection are shown in FIG. 10 and starts with the retrieval of identity of a certain work station step 1000. A determination is made as to whether the application label for the workstation is a known organization (step 1002) and if the full location details are valid (step 1004). In each case if the answer to this question is no the process stops (steps 1006 and 1008 respectively). If the answer to each question is yes the process continues.

The next determination at step 1010 is to determine whether the workstation ID is known in the TID dispenser database. If the answer to this question is no this equates to a first login step for the workstation and an auto registration mode is entered. A determination is then made as to whether the full location match is a configuration area (step 1012) if the answer is yes the configuration template is retrieved from the configuration area (step 1014). A determination is then made as to whether the full location matches an office identifier (step 1016) and then a determination as to whether there are enough TIDs in the pool (step 1018). If the answers to all of these questions are yes then a workstation configuration is created (step 1020). After the workstation configuration has been created the identity of the workstation is returned to the workstation, the TID dispenser, and any other media that needs to know (1028). In each case if the response to the question is no the process is exited (1022, 1024, 1026).

At step 1010 if the workstation ID is known to the TID dispenser database this equates to next login step (1030). A determination is then made as to whether the application identifier is known in the database (step 1032). If no, there may be a new application (1034). If there is a new application or not as the application identifier is not known in the database the process returns to step 1012 and determination of whether the full location matches configuration area is made. On the other hand, if the application identifier is known in the database workstation configuration is retrieved at step 1036. At step 1038 a determination is made as to whether the type list is compliant with the workstation configuration. If yes the identity is returned as above at step 1028.

If the answer is no at step 1038 a determination is made as to whether the workstation is in an auto registration or fixed mode (step 1040). If the workstation is in a fixed mode the identity of the workstation is returned and a warning is sent step 1042. The identify has the format as described in FIG. 8. The warning shows any discrepancy between stored identity and information received from the workstation. If the workstation is an auto registration mode a determination is made at step 1042 as to whether there are enough TIDs in pool. If yes, the workstation configuration is updated (step 1044) and any updates are registered (step 1046). The identities are then returned as above in step 1028. If at step 1042, there are not enough TIDs in the pool the process is exited (1048).

In this way the system according to the present invention can operate for all workstations in a given environment. The ability to identify whether the workstation is in a fixed or auto registration mode enables greater flexibility in the system and method of the present invention. In addition, it enables the gradual transfer of workstations from a fixed mode to an auto registration mode in a controlled and managed fashion.

At the stage of next log in, if the list of device types provided to the TID dispenser changes (in other words is different from the list provided at the previous login) the TID dispenser will automatically adapt the work station configuration by reusing the configuration template. Devices can thus be removed from or added to the work station configuration without any manual update from the device administrator. Device set ups of all the devices located in a location can be updated by changing the configuration template.

As has been indicated this invention relates to many different environments. The airport scenario described above, is just by way of example and it is clear that the invention can be used in any contexts. It will also be appreciated that the scenario described can have many variations and still remain within the spirit and scope of the present invention.

We claim:

1. A method of managing printing in an environment with a plurality of workstations and a plurality of printers in one or more networks each workstation having a unique ID and each printer having a type and a configuration which is dependant on the unique ID, wherein one or more of the printers is connected to a one of the plurality of workstations; and wherein the network also includes a document server and a identity generator, the method comprising:
   polling a workstation when it connects to the network to determine what printers are connected thereto;
   determining the unique ID of the workstation;
   determining the type of printer;
   determining the configuration of the printer from the type and workstation location;
   determining an identification code (ID code) for each printer connected to the connected workstation using the identification generator;
   developing a look up table of unique ID of the workstation; type and configuration of the printer and ID code;
   receiving a print request from a workstation at the document server;
   identifying the configuration of a printer from the look up table in response to the print request which can receive the print server;
   sending the print request to the identified printer with the appropriate ID code, as identified by the look up table
   wherein the step of determining the unique ID comprises determining a discriminator selected from the list containing location, function, definition, level of priority, age and company.

2. The method of claim 1 wherein the step of determining the unique ID of the workstation comprises auto-registration of the workstation at a first login and recognition of the workstation thereafter, and wherein auto-registration of the workstation is authorized on the basis of location of the workstation.

3. The method of claim 1, wherein the step of determining the configuration of printers comprises generating configurations from configuration templates determined from the work station location.

4. The method of claim 1, wherein the step of determining the configuration of printers comprises updating configurations from configuration templates determined from the work station location.

5. The method of claim 3, wherein the configuration templates are determined from a discriminator selected from the list containing location, function, definition, level of priority, age, company.

6. The method of claim 1, wherein the ID and configuration of a device is shared between several workstation configurations.

7. The method of claim 1 further comprising printing the print request at the printer with the appropriate ID in the configuration identified from the look up table.

8. The method of claim 1 further comprising storing the ID code and configuration for each printer in the identity generator for subsequent use in subsequent printing operations.

9. The method of claim 1 further comprising polling the workstation each time it connects to the network to determine what printers are connected thereto and updating the look up table if there is any change to the printers connected to the workstation.

10. The method of claim 1 further comprising identifying a printer which is not connected to the workstation making the printer request as the printer for receiving the print request.

11. The method of claim 1, wherein the step of generating a identification code (ID code) for each printer connected to the connected workstation using the identification generator comprises allocating an ID code which is the next available code of a set of codes based on the order in which the workstation connects to the identification generator.

12. The method of claim 11, further comprising reusing the ID codes if a workstation disconnects from the network.

13. The method of claim 12, further comprising re-allocation of a new set of ID codes when a workstation reconnects to the network.

14. A computer program comprising instructions for carrying out the steps of the method according to claim 1, when said computer program is executed on a computer system.

15. A printer manager for an environment with a plurality of workstations and plurality of printers in one or more networks each workstation having a unique ID and each printer having a type and configurations which is dependent on the unique ID, wherein one or more of the printers is connected to one of the plurality of workstations; and wherein the network includes a document server, the printer manager comprising:
   a device for polling workstation when it connected to the network to determine what printers are connected thereto, to determine: the unique ID of the workstation; the type of printer; the configuration of the printer from the type and workstation location;
   an identification generator for generating an identification code (ID code) for each printer connected to the connected workstation;
   a look at table of the unique ID of the workstation; type and configurations of the printer; and the ID code;
   wherein the step of determining the unique ID comprises determining a discriminator selected from the list containing location, function, definition, level of priority, age and company and
   wherein a printer request received from a workstation at the document server gives rise to a determination of the ID code from the lookup table to effect printing at the required workstation.

16. The printer manager of claim 15, wherein the step of determining the unique ID of the workstation comprises auto-registration of the workstation at a first login and recognition of the workstation thereafter, and wherein auto-registration of the workstation is authorized on the basis of location of the workstation.

* * * * *